United States Patent

[11] 3,607,504

| [72] | Inventor | James S. Howard |
| | | Riverside, Calif. |
| [21] | Appl. No. | 795,232 |
| [22] | Filed | Jan. 30, 1969 |
| [45] | Patented | Sept. 21, 1971 |
| [73] | Assignee | Rohr Corporation |
| | | Chula Vista, Calif. |

[54] METHOD OF FABRICATING A BOX BEAM
6 Claims, 13 Drawing Figs.

[52] U.S. Cl. .................................................. 156/155,
156/185, 156/187, 156/191, 156/306
[51] Int. Cl. ........................................................ B32b 31/00
[50] Field of Search ............................................ 156/155,
193, 185, 189, 187, 191, 195, 306, 250

[56] References Cited
UNITED STATES PATENTS

| 2,739,350 | 3/1956 | Lampman | 156/155 X |
| 2,755,216 | 7/1956 | Lemons | 156/155 |
| 3,396,923 | 8/1968 | Windecker | 156/155 X |

*Primary Examiner*—Carl D. Quarforth
*Assistant Examiner*—Stephen J. Lechert, Jr.
*Attorney*—George E. Pearson

ABSTRACT: Method of forming a lightweight compartmented box beam of resin-impregnated fiberglass tape and honeycomb core material, employing a segmented soluble mandrel about which said tape is wrapped.

INVENTOR.
JAMES S. HOWARD
BY
Edwin Grant
ATTORNEY

INVENTOR.
JAMES S. HOWARD

BY
Edwin Grant
ATTORNEY 3,607,504

METHOD OF FABRICATING A BOX BEAM

BACKGROUND OF THE INVENTION

This invention relates to a method of fabricating a structural member and more particularly to a method of forming a fiberglass-laminate-honeycomb core box beam suitable for use in aircraft construction.

Structural members for aircraft have long been fabricated of lightweight metals, chiefly aluminum alloys. However, it has recently been found that structural members formed of laminated sandwich materials can also advantageously be used in aircraft construction. Not only is the strength-to-weight ratio of such materials comparable to that of aluminum alloys, but also the physical characteristics of a plastic laminate structural member can conveniently be controlled so that the strength of the member is greatest in the direction in which maximum stress will be applied. However, while the design of the components of a laminated structural member to meet particular stresses may be relatively simple, the fabrication steps which are necessary to insure proper bonding and alignment of components of the selected design are often quite difficult to develop. This is particularly true in the case of laminated structural members which contain multiple cells separated by transversely disposed ribs.

SUMMARY OF THE INVENTION

In accordance with the invention disclosed herein, a multicell, two spar box beam is manufactured by use of a plurality of soluble mandrels which are arranged in alternate relation with a plurality of circumferentially flanged, centrally perforated ribs, said mandrels and ribs being locked together by means of plates positioned against the end surfaces of the outermost mandrels, rods extending through holes in said plates, mandrels and ribs, and nuts on said rods which are tightened against said plates. The outer surfaces of the flanges of the aforesaid ribs are covered with an adhesive such as epoxy, and then the upper, lower and side surfaces of the rib and mandrel assembly are wrapped with a number of layers of resin-impregnated fiberglass tape. The wrapped assembly is next subjected to elevated temperature and pressure to bond the aforesaid layers of tape together, thereby forming a stiffened tubular fiberglass skin, or laminate, which is supported on the mandrels and bonded to the ribs therebetween. In the next step of the disclosed fabricating process, two honeycomb cores are respectively bonded to the upper and lower surfaces of the tubular laminate. Strips of honeycomb core material are then fitted and bonded to the sides of the tubular laminate, and in the following step of the process a laminated channel-type spar is bonded to each of these side cores while laminated facing sheets are bonded to the aforesaid upper and lower cores. The soluble mandrels which have supported the components of the box beam throughout the preceding process steps are then dissolved and washed out of the interior of the tubular laminate.

OBJECTS OF THE INVENTION

Accordingly, an object of this invention is to provide a method of fabricating a structural member suitable for use in aircraft.

Another object of this invention is to provide a method of fabricating a laminated, multicell box beam which insures that all abutting surfaces thereof are properly bonded together.

Still another object of this invention is to provide a method of fabricating a laminated, multicell box beam which enables components to be supported by a plurality of rigid mandrels throughout the construction of the beam, thereby insuring proper alignment of said components, and which enables said mandrels to be removed after the beam has been completed.

Other objects and advantages of the invention will become apparent by consideration of the following detailed description of a preferred method of constructing a laminated box beam in accordance with its principles.

DESCRIPTION OF THE DRAWINGS

In the accompanying drawings.

Throughout the following specification and the drawings, like numbers refer to like parts.

DETAILED DESCRIPTION

Figure 1:
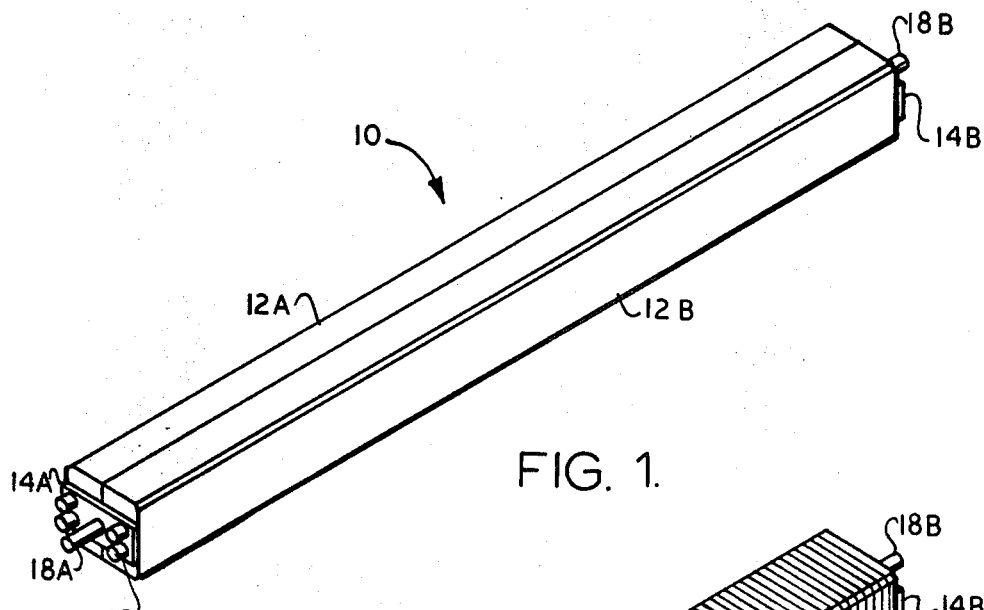
FIG. 1 is a pictorial view illustrating a separable mandrel used in the fabrication of components of a box beam constructed by the method of this invention.
Figure 2:
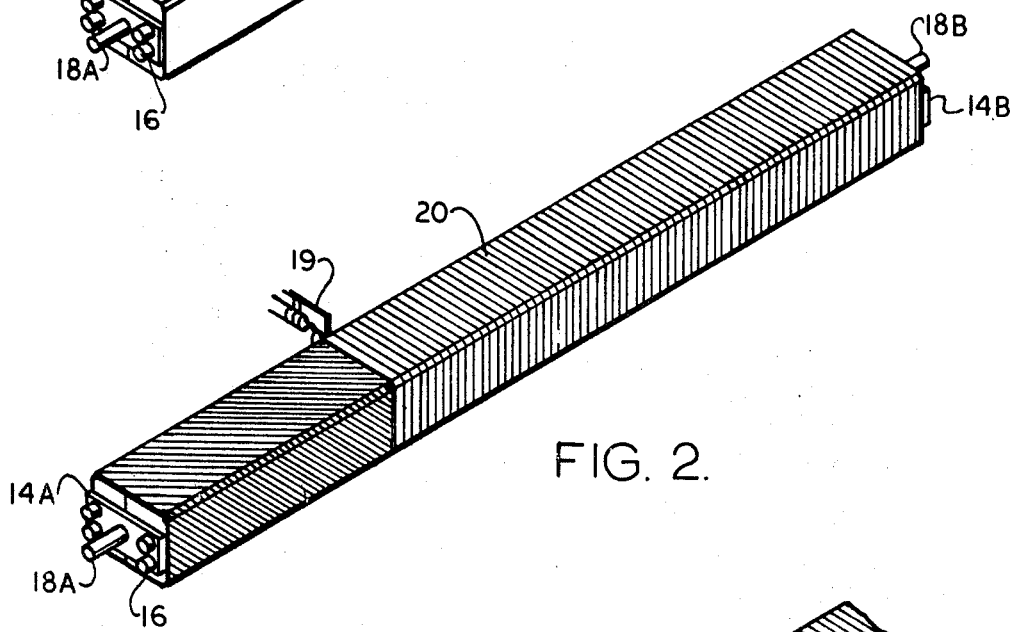
FIGS. 2 and 3 are pictorial views illustrating steps involved in wrapping the mandrel of FIG. 1 with resin-impregnated fiberglass tape.
Figure 3:
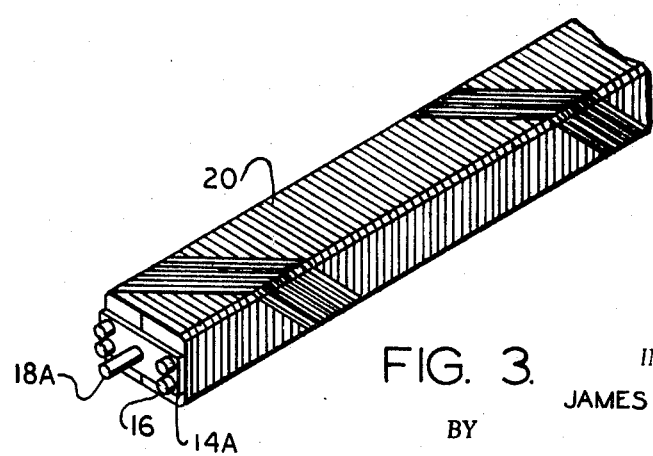

As illustrated in FIG. 1, a mandrel 10 employed in a preferred method of fabricating a box beam in accordance with this invention comprises first and second elongated, rigid mandrel sections 12A, 12B the ends of which may be locked together by means of two plates 14A, 14B and a plurality of bolts 16 which pass through holes in said plates and which are threadedly engaged within holes formed in the ends of said mandrel sections. Projecting from plates 14A, 14B respectively are two pins 18A, 18B which support mandrel 10 while resin-impregnated fiberglass tape 20 (See FIGS. 2 and 3) is wrapped in layers thereon by hand, or as illustrated in FIG. 2, by a suitable wrapping heat 19. The number and orientation of the layers of tape 20 will vary according to the desired characteristics of the two channel spars which, as will be seen hereinafter, are formed therefrom. After the required layers of tape have been wrapped upon mandrel 10 the tape is subjected to elevated temperature and pressure, preferably by placing the mandrel in a vacuum bag and then placing the assembly in an autoclave, thereby bonding the layers together and forming a stiffened fiberglass laminate. Since curing cycles will vary for the different resin-impregnated tapes which may be employed in the disclosed fabrication procedure and since the techniques of applying pressure and heat by means of vacuum bags and autoclaves are well known in the art, for the sake of brevity specific steps involved in curing tape 20 will be omitted here.

Figure 4:
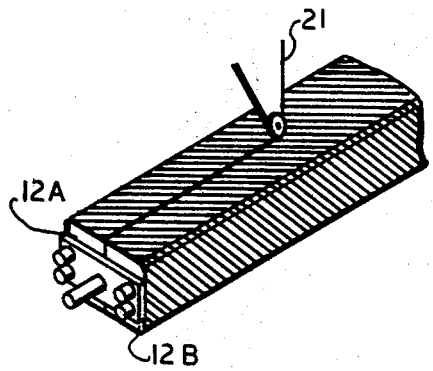
FIG. 4 is a view illustrating the cutting of the fiberglass laminate formed by exposure of the tape-wrapped assembly of FIG. 3 to heat and pressure.
Figure 5:
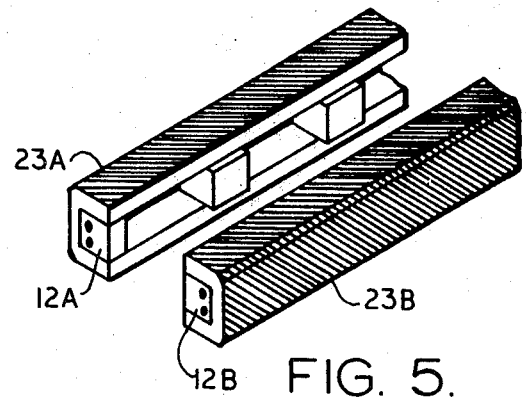
FIG. 5 is a fragmented view illustrating the aforesaid mandrel and laminate when separated into halves.

In FIG. 4 a wheel cutter 21 is illustrated in the process of cutting the aforesaid laminate along a line overlying the juncture of mandrel sections 12A, 12B, and in FIG. 5 the mandrel sections are illustrated when separated, it being apparent in the latter drawing that the foregoing procedural steps provide a pair of laminated channel spars 23A, 23B each supported on a respective one of the mandrel sections. As will be seen hereinafter, the two spar mandrel assemblies are used in subsequent steps of the fabrication method to hold components in proper position while they are being bonded together.

Figure 6:
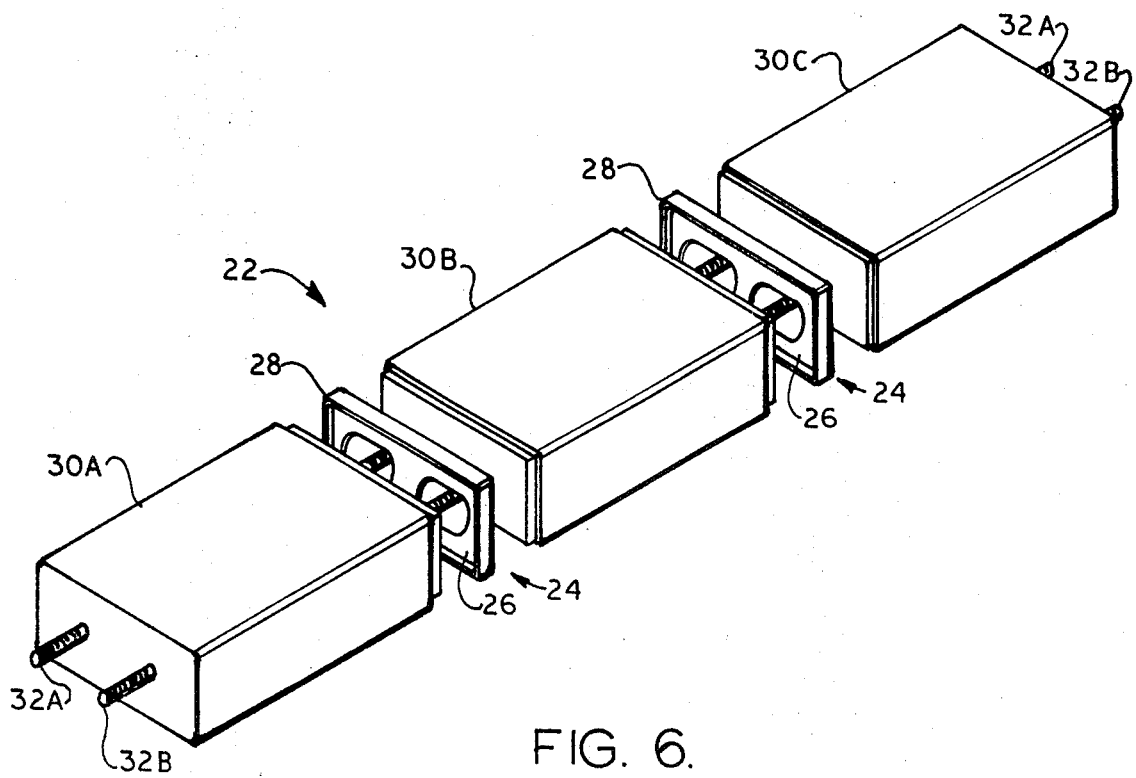
FIG. 6 is a pictorial view of a plurality of soluble mandrels, structural ribs, and locking rods employed in the preferred fabrication method of the invention.

Illustrated in FIG. 6 is another mandrel assembly 22 advantageously employed, in accordance with this invention, in the fabrication of a box beam of any desired length, cross section, a number of compartments. However, for the sake of simplicity, the following description and the drawing are directed toward the arrangement of a box beam having only three compartments respectively separated by two ribs each generally designated by the number 24 and preferably formed of laminated materials. More particularly, each rib comprises a rectangular, perforated panel 26 having rounded corners, and a flange 28 of uniform width which is integrally joined to and extends around the edge of said panel and which projects at a right angle from each side thereof. Ribs 24 are disposed in alternate relation with three mandrels 30A, 30B, 30C each formed in the following manner.

One part by volume of granular polyvinyl alcohol is slowly added to three parts by volume of hot water while the mixture is being mixed by means of a power mixer. The solution is held in an airtight container for 24 hours and is then mixed with silica sand by means of a power mixer for a minimum of 10 minutes, in a ratio of one-half pint of the solution to 1 gallon of sand. The resulting mixture is then tamped into a mold and cured for 12 hours at a temperature of about 350° F. under atmospheric pressure. The pores of the mandrel thus formed are sealed with a suitable sealant.

Figure 7:
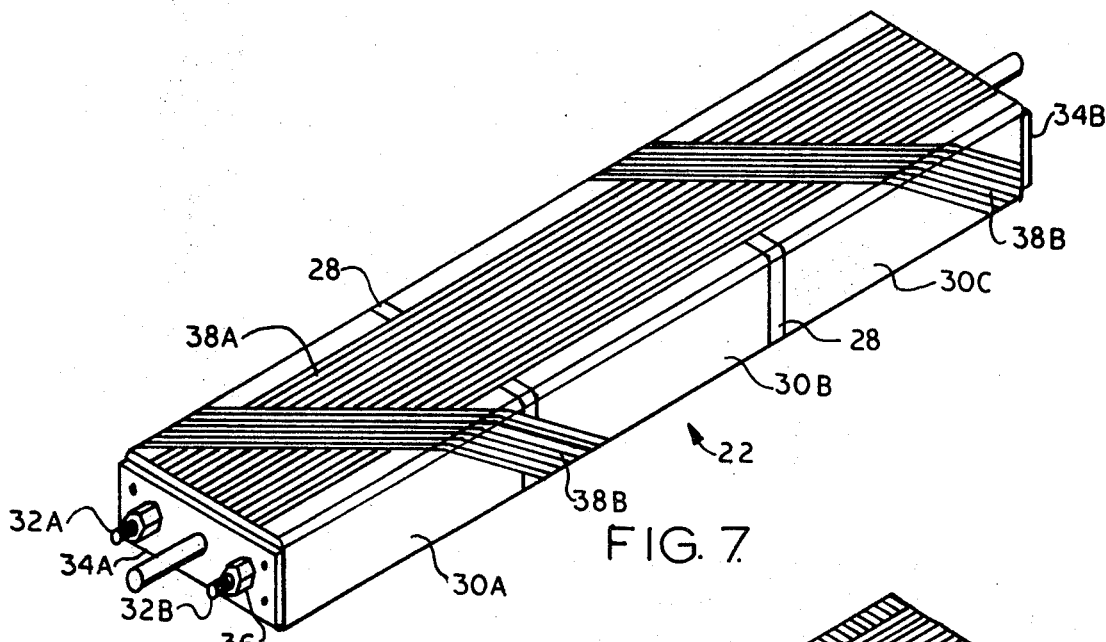
FIG. 7 illustrates the mandrels and ribs shown in FIG. 6 after they have been locked together to form a rigid mandrel assembly and after two layers of resin-impregnated fiberglass tape have been placed thereon.
Figure 8:
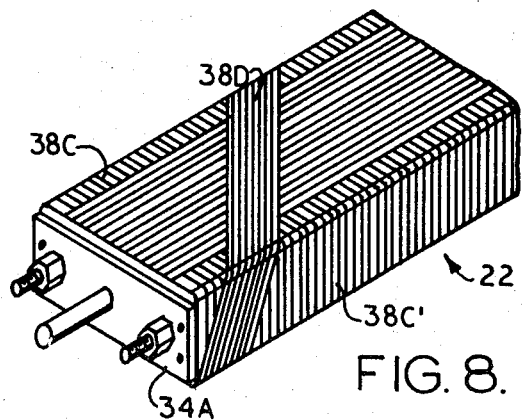
FIG. 8 is a fragmented view of the same mandrel assembly with two additional layers of the aforesaid tape wrapped thereon.

The outer surfaces of each of the mandrels 30A, 30B, 30C conform with the outer surfaces of the flanges 28 of ribs 24, and the ends of said mandrels adjacent said ribs are recessed so as to conformably fit within the flanges of the latter (i.e., the end portions of respective mandrels abut the inner surfaces of flanges 28 on both sides of panels 26, and the end surfaces of the mandrels also abut the panels). Two holes extend between the end surfaces of each of the mandrels 30A, 30B, 30C, and thus the mandrels and ribs 24 can be locked in abutting relation as illustrated in FIG. 7 by passing two rods 32A, 32B through these holes and through the holes in the panels 26 of said ribs, placing apertured end plates 34A, 34B on said rods and against the end surfaces of mandrels 30A, 30B respectively, and engaging nuts 36 on the threaded ends of said rods and tightening them against said end plates. Epoxy adhesive in uncured sheet form is placed on the outer surfaces of the flanges 28 of ribs 24, and then a layer 38A of resin-impregnated fiberglass tape is laid upon each of the upper and lower surfaces of the mandrel and rib assembly in side-by-side strips which extend longitudinally thereof. A second layer 38B of the same tape is next wrapped around the mandrel assembly in continuous strips which are disposed at an angle of 45° with respect to the longitudinal axis of said assembly, the tape being laid in separate windings until the upper, lower and side surfaces are completely covered. As illustrated in FIG. 8, a third layer 38C, 38C' of the tape is then laid in two separate sets of side-by-side strips which are respectively disposed on the side surfaces and the edges of the upper and lower surfaces of mandrel assembly 22 and which are perpendicular to the longitudinal axis of said assembly. Finally, a fourth layer 38D of the same tape is wrapped in continuous strips which are disposed at an angle of 45° with respect to the longitudinal axis of mandrel assembly 22 and which run in the direction opposite to that of the strips of layer 38B of the tape. Again the tape is laid in separate windings until the surfaces which are uncovered in FIG. 8 are wrapped. Other layers of tape may be added as desired, and the number and arrangement of the layers do not affect the scope of this invention.

The aforesaid layers of resin-impregnated tape are then subjected to heat and pressure by means of a conventional vacuum bag and an autoclave, thereby forming a stiffened tubular fiberglass laminate 40 (See FIG. 9) which is supported by the soluble mandrels 30 and bonded to the flanges 28 of ribs 24.

Figure 9:
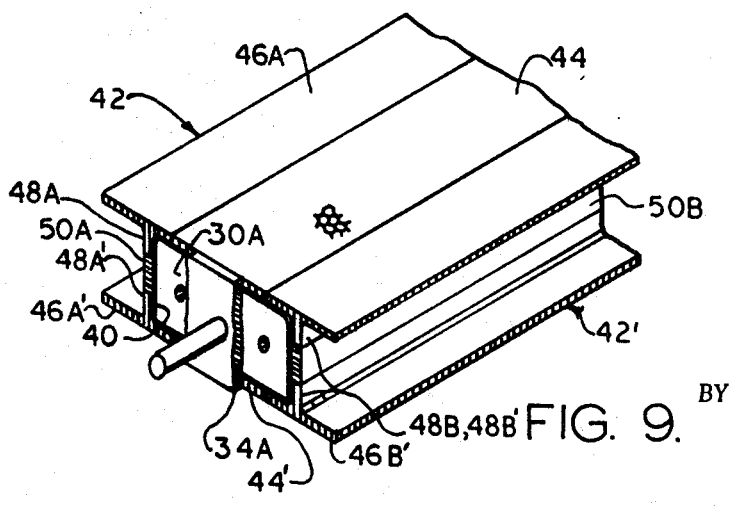
FIG. 9 is a fragmented view of the same assembly after honeycomb core strips have been placed on the upper and lower surfaces thereof and after temporary support strips have been placed against the side surfaces thereof, an end plate of the mandrel assembly being broken away in the drawing for clarity.
Figure 10:
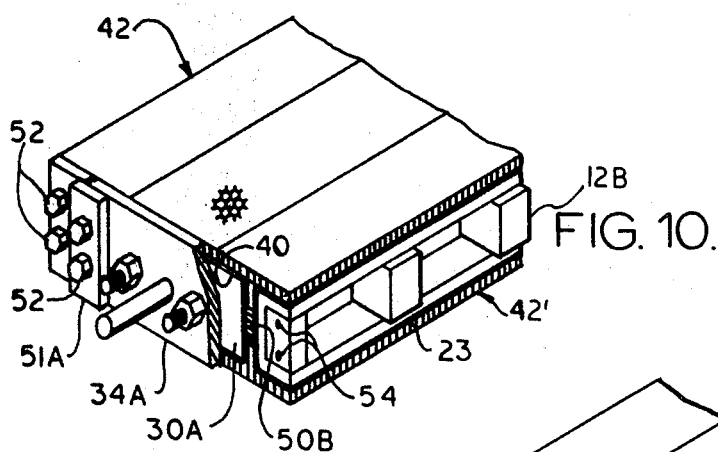
FIG. 10 is a fragmented view of the same assembly after the mandrels shown in FIG. 5 have been attached thereto, an end plate of the mandrel assembly being broken away in the drawing for clarity.

Also illustrated in FIG. 9 are upper and lower honeycomb core strips, generally designated in the drawing by the numbers 42 and 42', which are bonded to the tubular laminate 40 in the next step of the disclosed fabrication process. Each of these core strips comprises a central strip 44, 44' and two edge portions 46A, 46B, 46A', 46B' each of which is T-shaped in cross-sectional configuration and bonded along one arm thereof to one of the longitudinally extending edges of said central strip 44, 44'. Hence each core strip 42, 42' includes a pair of parallel walls 48A, 48B, 48A', 48B' which project from one side thereof and the inner surfaces of which are shaped to conform with the curved edges of tubular laminate 40. The cell walls of core strips 42, 42' are disposed perpendicular to the upper and lower surfaces of said tubular laminate; the ribbon direction of the central strips 44, 44' is parallel to the longitudinal axis of the laminate and the ribbon direction of edge portions 46A, 46B, 46A', 46B' is perpendicular to said longitudinal axis. Before core strips 42, 42' are positioned on the upper and lower surfaces of tubular laminate 40 as illustrated in the drawing, these surfaces of the laminate are covered with epoxy adhesive in uncured sheet form (not shown). After the core strips 42, 42' are positioned as illustrated, temporary support strips 50A, 50B (which are preferably formed of honeycomb core material) are placed against the side surfaces of tubular laminate 40, with a suitable release agent being applied to the surfaces of said support strips which contact the laminate. The mandrel sections 12A, 12B pictured in FIG. 5, with laminated spars 23A, 23B respectively supported thereon, are next placed along the sides of the tubular laminate 40 as illustrated in FIG. 10, with the flange portions of said spars abutting the arms of edge portions 46A, 46B, 46A', 46B' of core strips 42, 42' which project laterally outward from walls 48A, 48B, 48A', 48B' of said core strips. Two plates 51A, 51B (only one of which is shown in FIG. 10), each formed of two rectangular sections which are overlapped as illustrated in the drawing and welded together, are next secured to each of the end plates 34A, 34B by means of bolts 52. Mandrel sections 12A, 12B are then locked in position against the sides of laminate 40 by means of bolts 52 which are passed through holes (not shown) formed in plates 51A, 51B and threadedly engaged within holes 54 formed in the end portions of said mandrel sections 12A, 12B.

Thin aluminum sheets (not shown), known in the art as caul plates, are placed upon the outer surfaces of core strips 42, 42' and the assembly is enclosed in a vacuum bag and placed in an autoclave to subject said core strips to elevated temperature and pressure for the purpose of curing the adhesive between the latter and the tubular laminate 40. It should be noted here that mandrel sections 12A, 12B support the outer edge portions of core strips 42, 42' during this bonding operation, and support strips 50A, 50B support the laminated spars 23A, 23B and prevent crushing of the longitudinally extending edges of walls 48A, 48B of core strips 42, 42' which would occur if said core strips 50A, 50B were not employed and mandrels 12A, 12B were displaced inwardly by the pressure exerted against them.

Figure 11:
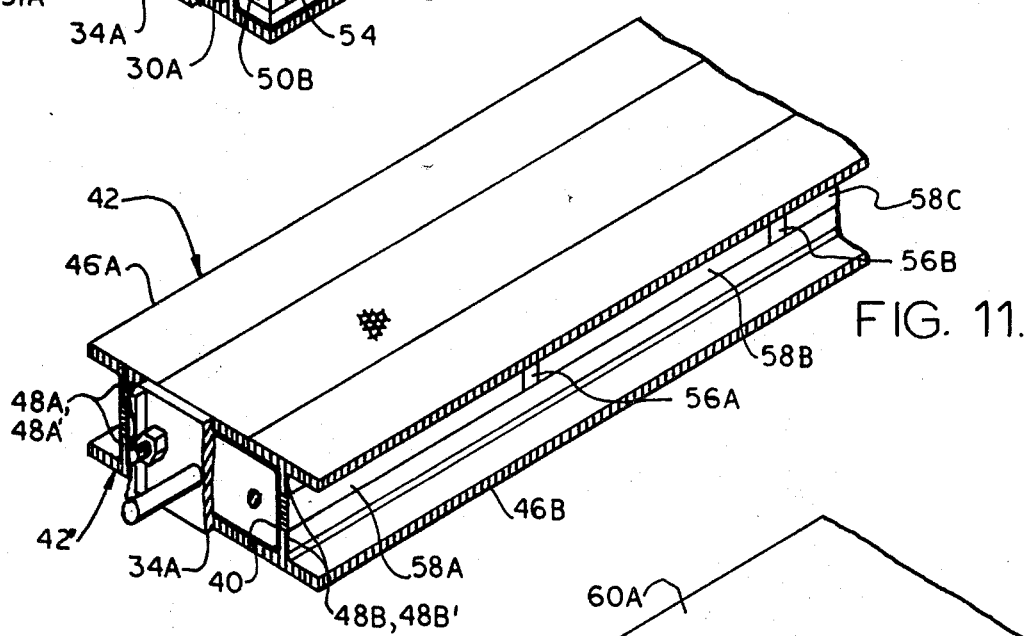
FIG. 11 is a fragmented view of the same assembly after the aforesaid honeycomb core strips have been bonded to the upper and lower surfaces thereof and after the aforesaid temporary support strips have been removed and replaced by other components, an end plate of the mandrel assembly being broken away in the drawing for clarity.
Figure 12:
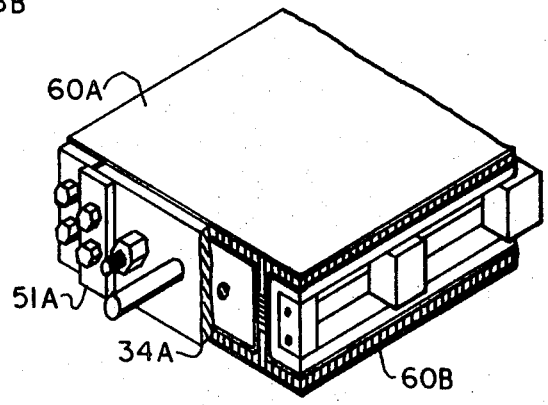
FIG. 12 is a pictorial view illustrating components of the box beam mandrel assembly as they appear in the final step of the preferred fabrication method of this invention, an end plate of the mandrel assembly being broken away in the drawing for clarity.
Figure 13:
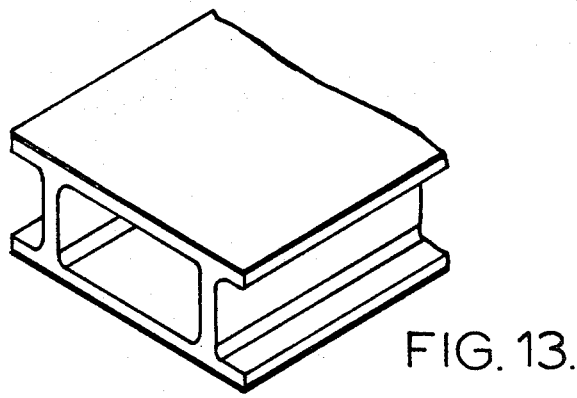
FIG. 13 is a view of the completed box beam constructed in accordance with the invention.

After core strips 42, 42' have been bonded to tubular laminate 40 mandrel sections 12A, 12B are removed from the assembly by removing bolts 52 and, as illustrated in FIG. 11, two laminated inserts 56A, 56B are formed to fit vertically between the end surfaces of the opposed walls 48 of core strips 42, 42', the width of said inserts being equal to that of flanges 28 of ribs 24 and the inserts being positioned so that they lie over respective ones of said flanges. Three side honeycomb core strips 58A, 58B, 58C are also formed to fit between the end surfaces of the opposed walls 48 on each side surface of tubular laminate 40, core strip 58B being abuttingly disposed between inserts 56A, 56B and core strips 58A, 58B abutting a respective one of said inserts and being coterminous with respective ends of said tubular laminate. The cell walls of side core strips 58 are disposed perpendicular to the sidewalls of laminate 40, and the ribbon direction of each of said side core strips is perpendicular to the upper and lower surfaces of said laminate 40. Epoxy adhesive in uncured sheet form (not shown) is placed upon the inner and edge surfaces of the aforesaid inserts 56A, 56B and side core strips 58A, 58B, 58C, and the latter are pressed into position as illustrated in FIG. 12. The exposed side and flange surfaces of spars 23A, 23B are covered with a release agent and the mandrels 12A, 12B on which said spars are supported are again attached to plates 51A, 51B by means of bolts 52 as previously described (See FIG. 10). Caul plates (not shown) are placed on the outer surfaces of upper and lower core strips 42, 42', and the assembly is enclosed in a vacuum bag and placed in an autoclave to bond inserts 56 and side core strips 58 to tubular laminate 49 and to each other. Thereafter mandrel sections 12A, 12B are removed from the assembly and the exposed side and flange surfaces of the spars 23A, 23B are cleaned by means of solvent and light sanding. These cleaned surfaces of the spars 23A, 23B are then covered with epoxy adhesive in uncured sheet form (not shown), and mandrel sections 12A, 12B are again attached to plates 51A, 51B to bring the adhesive covered surfaces of said spars into contact with the inserts 56 and side core strips 58 located on respective sides of tubular laminate 40 (See FIG. 12). Epoxy adhesive in uncured sheet form (not shown) is also placed upon the outer surfaces of upper and lower core strips 42, 42', laminated facing sheets 60A, 60B are placed on said adhesive-covered surfaces, and the assembly is enclosed in a vacuum bag and placed in an autoclave to bond spars 23A, 23B to inserts 56, to side core strips 58A, 58B, 58C, and to the laterally extending flanges of upper and lower core strips 42, 42', and to bond facing sheets 60 to upper and lower core strips 42, 42'. Mandrel sections 12A, 12B and plates 34A, 34B are then removed from the laminated box beam formed by the foregoing fabrication steps, and rods 32A, 32B are pulled out of the soluble mandrels 30A, 30B 30C which have supported tubular laminate 40. The soluble mandrels 30 are then dissolved and washed out of the tubular laminate 40 by means of a mixture of steam, hot water, and a detergent. The open cells of the honeycomb core material at the edges of upper and lower core strips 42, 42' and side core strips 58A, 58C are thereafter filled with a suitable potting compound to make the edges of the box beam smooth. The completed box beam is illustrated in FIG. 13.

A resin-impregnated fiberglass tape suitable for use in the fabrication of all laminated components which have been mentioned hereinbefore is that distributed by Minnesota Mining and Manufacturing Company under their product designation XP-251S. The epoxy adhesive distributed by the same company under the product designation AF 110B has also been found suitable for bonding the aforesaid components together.

One of the important advantages of the fabrication process which has been disclosed hereinabove is that it provides a compartmented box beam the laminated components of which are strongly bonded to one another at all contiguous surfaces. Furthermore, the use of soluble mandrels 30 to support tubular laminate 40 while honeycomb cores are being bonded thereto, as well as the use of mandrel sections 12A, 12B during the separate bonding steps as described, results in the production of a box beam which is of exact dimensions and precise alignment. Inspection of the quality of bonds between honeycomb cores and tubular laminate 40 can also readily be made in accordance with the disclosed sequence of fabrication steps.

It will be recognized that certain modifications in the described preferred method of fabricating a box beam may be made without departing from the principles of the invention. For example, the arrangement of the layers of resin-impregnated fiberglass tape placed on laminate 40 may differ for box beams designed for particular applications, and the invention is of course not limited with respect to the cross-sectional configuration of ribs 24 and mandrels 30. The present embodiment of the invention is therefore to be considered in all respects as illustrative and not restrictive, the scope of the invention being indicated by the appended claims, and all changes coming within the meaning and range of equivalency of the claims are intended to be embraced therein.

Having thus described the invention, what is claimed as new and useful and desired to be secured by Letters Patent is:

1. A method of fabricating a multicell, two spar box beam comprising the steps of:

forming a mandrel assembly comprising a series of soluble forms separated by perforated ribs and placing adhesive on the periphery of each of said ribs;

wrapping resin-impregnated tape on said mandrel and curing said resin and adhesive to form a stiffened tubular laminate bonded to said ribs;

bonding with adhesive honeycomb cores to the upper and lower outer surfaces of said laminate;

said honeycomb cores having their cell walls disposed perpendicular to said laminate surfaces;

bonding with adhesive a pair of spars positioned between said honeycomb cores with one of said spars abutting each side of said laminate; and a pair of facing sheets to respective ones of said cores; and bonding with adhesive a facing sheet to the exterior surface of each of said honeycomb cores; and dissolving said soluble forms to remove the same from said laminate.

2. A method of fabricating a multicell, two spar box beam comprising the steps of:

forming a plurality of ribs each comprising a rectangular, perforated panel having rounded corners and a flange integrally joined to and extending around the edge of said panel and projecting at a right angle from each side thereof;

locking said ribs and a plurality of soluble mandrels together in alternate relation so that one of said ribs is abuttingly disposed between end surfaces of adjacent mandrels, said mandrels having surfaces which conform to the outer surfaces of the flanges to said ribs and each being formed with at least one recessed end that conformably fits within one of said flanges, whereby said interlocked ribs and mandrels form a mandrel assembly having plane upper, lower, and side surfaces;

placing adhesive on the outer surfaces of the flanges of said ribs, wrapping a plurality of layers of resin-impregnated fiberglass tape on the upper, lower and side surfaces of said mandrel assembly, and applying pressure to said tape while subjecting it to predetermined temperature to form a stiffened tubular laminate supported by said soluble mandrels and bonded to said ribs;

bonding with adhesive upper and lower honeycomb core strips to the upper and lower surfaces of said tubular laminate respectively, the length of said core strips being substantially equal to the length of said tubular laminate and their width being greater than the width of the latter so that each of said core strips includes laterally extending flanges which project from the sides of said laminate, each of said core strips also including a pair of walls which project perpendicularly from one side thereof and which extend longitudinally of said tubular laminate and conform with the curved edges thereof;

bonding with adhesive a plurality of laminated inserts and side honeycomb core strips to the side surfaces of said tubular laminate, said laminated inserts being arranged so that they respectively overlie the portions of the flanges of said ribs which are disposed between the end surfaces of opposed pairs of the walls of said upper and lower core strips, and the edges of said side core strips also being bonded to said laminated inserts and to the walls of said upper and lower core strips;

bonding with adhesive a facing sheet to the outer side of each of said upper and lower core strips, and a channel spar to said laminated inserts, to said side core strips, and to the laterally extending flanges of said upper and lower core strips on each side of said tubular laminate; and dissolving said soluble mandrels to remove the same from said tubular laminate.

3. The method defined in claim 2 wherein said soluble mandrels are formed with holes extending between the end surfaces thereof, and said soluble mandrels and structural ribs are locked together by means of apertured plates respectively positioned against the end surfaces of said mandrel assembly, a pair of rods extending through the holes in said soluble mandrels, ribs, and plates, and nuts threadedly engaged with said rods and tightened against said plates.

4. The method defined in claim 2 wherein the adhesive used to bond components of said box beam together is sheet epoxy.

5. The method defined in claim 2 wherein said channel spars are positioned along the sides of said tubular laminate during the bonding of said upper and lower honeycomb core strips to said laminate, to thereby hold said strips in proper alignment with respect to said laminate and support the laterally extending flanges of said strips during said bonding step.

6. The method defined in claim 5 wherein said channel spars are also positioned along the sides of said tubular laminate during the bonding of said laminated inserts and side honeycomb core strips to said laminate, to thereby support the laterally extending flanges of said upper and lower honeycomb core strips during said bonding step.